United States Patent [19]

Martzloff

[11] 3,863,111

[45] Jan. 28, 1975

[54] POLYCRYSTALLINE VARISTOR SURGE PROTECTIVE DEVICE FOR HIGH FREQUENCY APPLICATIONS

[75] Inventor: Francois D. Martzloff, Schenectady, N.Y.

[73] Assignee: General Electric Company, Schenectady, N.Y.

[22] Filed: June 29, 1973

[21] Appl. No.: 374,933

[52] U.S. Cl. .................... 317/61.5, 317/53, 317/67, 317/50, 333/76, 333/13, 338/21, 338/216

[51] Int. Cl. .......................... H02h 3/20, H02h 3/22

[58] Field of Search .......... 317/61, 61.5, 66, 235 A, 317/234 A, 261; 338/20, 21, 216; 200/166, 222; 333/70 C, 70 S, 79, 80 R, 80 T, 70 CR, 73 C, 76

[56] References Cited

UNITED STATES PATENTS

| | | | |
|---|---|---|---|
| 2,176,211 | 10/1939 | Cork et al. | 333/73 C |
| 2,896,128 | 7/1959 | Fuller et al. | 317/61 |
| 3,274,447 | 9/1966 | Nelson | 317/61 |
| 3,310,766 | 3/1967 | Downing et al. | 338/20 |
| 3,496,435 | 2/1970 | Manley | 317/261 |
| 3,521,200 | 7/1970 | Matsushima et al. | 333/79 |
| 3,611,073 | 10/1971 | Hamamoto | 338/20 |
| 3,703,665 | 11/1972 | Yereance | 317/61 |
| 3,711,794 | 1/1973 | Tasca et al. | 338/21 |
| 3,728,584 | 4/1973 | Kuhlow | 317/234 A |

*Primary Examiner*—J. D. Miller
*Assistant Examiner*—Patrick R. Salce
*Attorney, Agent, or Firm*—Donald R. Campbell; Joseph T. Cohen; Jerome C. Squillaro

[57] ABSTRACT

A polycrystalline varistor of the bulk effect zinc oxide base type adapted for use in voltage surge suppression on VHF signal lines is disclosed. The device comprises a connector having a housing attached thereto containing a polycrystalline varistor and a conductive spring member. The spring member is configured to provide for the proper mechanical positioning of the varistor and to provide an electrical inductance in series with the varistor to prevent capacitive loading of the protected signal line.

9 Claims, 2 Drawing Figures

POLYCRYSTALLINE VARISTOR SURGE PROTECTIVE DEVICE FOR HIGH FREQUENCY APPLICATIONS

BACKGROUND OF THE INVENTION

I. Scope

This invention relates to polycrystalline metal oxide varistors. More particularly, this invention relates to adaptation of such varistors to provide protection for VHF signal lines.

II. Prior Art

It is important to provide protection for equipment connected to VHF signal cables, particularly CATV cables, from high amplitude voltage surges, particularly atmospheric lightning produced surges. In present CATV systems, a single coaxial conductive pair is employed to simultaneously transmit VHF signal energy and operating power between successive repeater amplifiers of the system. Within a typical repeater amplifier enclosure, filters are employed to separate the VHF signal from the low frequency operating power. The incoming transmission line is separated into two parallel lines. A high pass filter is connected to one of the parallel lines to pick off signal energy. A low pass filter is connected to the other of the parallel lines to pick off operating power Protection against lightning surges is provided by shunting the output of the high pass signal filter with a spark gap, and shunting the output of the low pass power filter with a Zener diode. Zener diodes have limited power handling capability; however, because lightning produced voltage surges have very fast rise times, the low pass filter greatly attenuates the voltage surge appearing on the power pick-off line, and brings it within the capability of a Zener diode. It follows that most of the lightning surge energy appears on the signal pick-off line and must be suppressed by the spark gap. The use of a spark gap surge suppressor in this application is less than ideal for two reasons. Firstly, there is a volt-time firing lag which is inherent in the operation of spark gaps. This results in significantly incomplete suppression of the voltage surge. Secondly, once the spark gap has fired, a plasma conduction path exists between the electrodes thereof and a portion of signal energy is lost unnecessarily in the period of time between the end of the lightning pulse and the resetting of the spark gap by extinguishment of the plasma path.

It might occur to one skilled in the art that the afor-mentioned shortcomings of spark gaps and the Zener diodes as surge suppressors might be obviated by substituting varistor devices for them. However, such a direct substitution is ineffective in VHF applications for reasons set forth hereinafter.

There are a few known substances whose resistance characteristic is non-linear and is expressed by the equation $$I = (V/C)\alpha$$

where

I is the current flowing through the material,

V is the voltage applied across the material,

C is a constant which is a function of the physical dimensions of the body, its composition, and the parameters of the process employed to form the body, and $\alpha$ is a constant for a given range of current and is a measure of the non-linearity of the resistance characteristic of the body.

A well-known example of such varistor materials is silicon carbide. Silicon carbide and other non-metallic varistor materials are characterized by having a alpha exponent of less than 6. Recently, a family of polycrystalline metallic oxide varistor materials have been produced which exhibit an alpha exponent in excess of 10. These new varistor materials comprise a sintered body of zinc oxide crystal grains, including additionally an intergranular layer of other metal oxides and/or halides, as, for example, beryllium oxide, bismuth oxide, bismuth fluoride, or cobalt fluoride, and are described, for example, in U.S. Pat. No. 3,682,841, issued to Matsuoka et al on Aug. 8, 1972 and U.S. Pat. No. 3,687,871, issued to Masuyama et al on Aug. 29, 1972.

In basic structure, both the silicon carbide and metal oxide varistors comprise a body, usually disk shaped, of varistor material having a pair of electrodes applied to opposite major faces thereof. This structure provides devices which are inherently capacitive.

The magnitude of the capacitance of these varistor devices is such that they would significantly load a VHF signal line if connected in shunt therewith. Furthermore, with respect to the silicon carbide varistor, there is an additional problem resulting from the high steady state ohmic leakage current thereof. In other words, because of the inherent characteristics thereof, neither of these varistors may be directly substituted in the CATV signal line application discussed above. The silicon carbide varistor could not be substituted for the Zener diode in the power line example whereas the metal oxide varistor could advantageously be substituted for the Zener diode.

III. Cross-reference to Related Copending Application

This invention is related to copending application of Anderson and Martzloff, Ser. No. 375,132, filed of even date herewith and assigned to the assignee of this invention.

BRIEF DESCRIPTION OF THE INVENTION

It is an object of this invention ot provide apparatus including a polycrystalline metal oxide varistor for suppression of voltage surges on VHF transmission lines.

It is another object of this invention to provide such apparatus wherein a single structure provides protection of a CATV system with respect to both VHF signal frequency and low frequency power components.

It is another object of this invention to provide such apparatus which has a high power dissipation capability.

It is another object of this invention to provide such apparatus which is readily insertible, in a T configuration, in a conventional CATV cable.

Yet another object of this invention is to provide such apparatus having improved switching speeds with comparison to spark gaps.

Briefly, and in accordance with one embodiment of this invention, a coaxial cable connector has a housing attached thereto. The housing contains a polycrystalline varistor element and a conductive spring member. The spring member is configured to provide for the proper mechanical positioning of the varistor element within the housing. Electrically, the spring member and varistor combine to present a series resonant circuit across the conductors of the connector.

The novel features of this invention sought to be patented are set forth with particularity in the appended claims. The invention, together with further objects and advantages thereof, may be understood from a reading of the following specification and appended claims in view of the accompanying drawing.

DETAILED DESCRIPTION OF THE INVENTION

Figure 1:
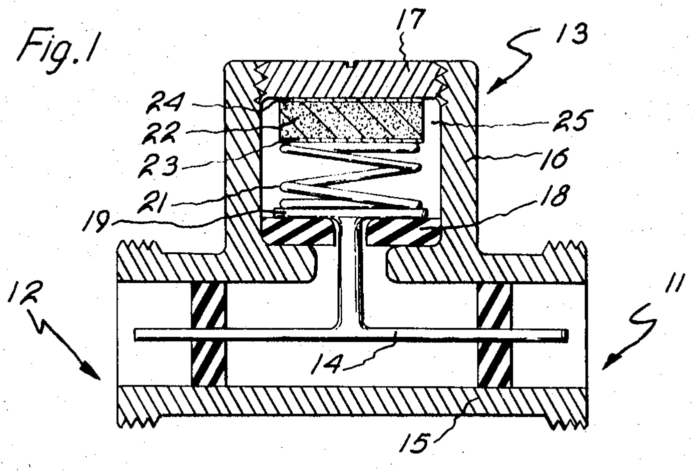
FIG. 1 is a sectional elevation view of protective apparatus in accordance with one embodiment of this invention.

FIG. 1 illustrates an embodiment of this invention which is adapted to be directly inserted into a coaxial cable. Connectors 11 and 12 are attached to mating connectors on the cable and inner conductor 14 and outer conductor 15 of connectors 11 and 12 constitute a small section of the cable to which they are attached. Connector members 11 and 12 are mechanically continuous with a housing indicated generally at 13 which housing is electrically continuous with conductor member 15. Housing member 13 may comprise a shell member 16 and a screw cap member 17. Housing member 13 contains annular insulating member 18 which supports conductive member 19. Conductive member 19 is electrically connected to central conductor 14 of connectors 11 and 12. Conductive member 19 supports a spring member 21. Spring member 21 is an electrically conductive coil spring and may, for example, be made of beryllium copper alloy. Spring 21 supports a polycrystalline metal oxide varistor element indicated generally at 25 and urges varistor 25 into contact with screw cap member 17. Obviously, the positioning of the varistor and spring member could be reversed if desired. However, for a reason set forth hereinafter, the preferred construction is as shown.

Varistor 25 comprises a body of polycrystalline metal oxide varistor material 22 having a pair of metallic electrodes 23 and 24 on opposite faces thereof. Varistor material 22 has the characteristic that when an electrical potential which does not exceed a magnitude known as the varistor voltage of the varistor device and is a function of the thickness, composition, and fabrication process of body 22, is applied between electrodes 23 and 24, the resistance to a flow of electric current between electrodes 23 and 24 is on the order of several thousands of megohms. Accordingly, it may be seen that with low voltages applied between electrodes 23 and 24, the device behaves electrically essentially as a capacitor. While very little steady state d-c leakage current flows through these new polycrystalline metal oxide varistor devices, at very high frequencies, because of the capacitive nature of the varistor devices, substantial capacitive leakage currents flow. As a point of comparison, in the case of prior art varistor devices, such as silicon carbide varistor devices, the low voltage resistance of the device is typically less than 1/10 megohm. Accordingly, d-c leakage is a problem with prior art varistors. Structurally, however, the silicon carbide varistors are similar to the polycrystalline metal oxide varistors and so additionally, capacitive leakage is a problem at very high frequencies for both varistor types.

In accordance with this invention, spring member 21, in addition to positioning varistor 25 in contact with screw cap member 17, functions electrically as an inductor in series with varistor 25. Accordingly, electrically, the combination of members 21 and 25 constitute, at low voltages, an LC series resonant circuit connected across conductors 14 and 15 of connectors 11 and 12. The device is so constructed, as will hereinafter be more fully described, to exhibit series resonance at a frequency below the VHF range. Accordingly, at VHF, the device presents a high impedance and so may be connected across a VHF signal line without introducing any significant losses in the VHF signal.

The energy coupled into a transmission line from an atomspheric lightning stroke typically has almost all of its energy in the spectral region below several megahertz. Typically, most of the energy is contained in the spectral segment between 100 kilohertz and 3 megahertz. It might be assumed, therefore, that the preferred design would call for providing series resonance in the neighborhood of 1 megahertz. However, it should be remembered that the varistor switching time is very short, on the order of a few nanoseconds, and that once the varistor element has become conductive, the capacitive reactance of the varistor element is no longer in the circuit. Therefore, the resonant frequency of the device is not critical so long as it is sufficiently below VHF for the device to present a high impedance to the VHF signal frequencies.

For example, a device which was constructed in accordance with this invention, employing a four-turn air core inductive element, exhibited a resonant frequency of 18 megahertz and functioned as intended in accordance with the above recited objects of this invention in a VHF signal line.

Figure 2:
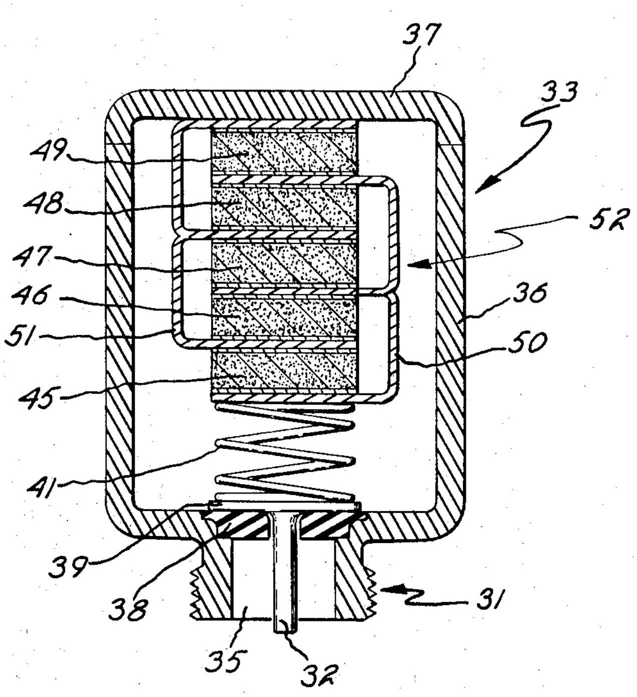
FIG. 2 is a sectional elevation view of protective apparatus in accordance with another embodiment of this invention.

FIG. 2 illustrates alternative configurations of apparatus in accordance with this invention. In FIG. 2 a connector 31 is formed integrally with a housing indicated generally at 33. Housing 33 comprises main portion 36 and cap portion 37. The center conductor 32 of connector 31 has a generally disk-shaped conductive portion 39 at one end thereof and is spaced from housing member 36 and outer conductor 35 of connector 31 by insulator member 38 which supports disk-like member 39 interiorily housing 33. Member 39 supports conductive spring member 41. Spring member 41 is similar to spring member 21 discussed with reference to FIG. 1. A plurality of polycrystalline varistor elements 45, 46, 47, 48, and 49 are assembled in a stack configuration, indicated generally at 52, with generally E shaped conductive members 50 and 51. Members 50 and 51 serve to provide the mechanical configuration of stack 52 and further serve to provide for electrically parallel interconnection among varistor elements 45, 46, 47, 48, and 49 to increase the power handling capability of stack 52 over that of a single varistor element. Members 50 and 51 are configured as shown to provide electrical symmetry among the conductive paths associated with each varistor element to thereby improve the uniformity of current sharing thereamong. Stack assembly 52 is supported by and urged into contact with cap member 37 by spring member 41.

When the inventive device has been assembled as hereinbefore set forth, cap member 37 may be secured to base member 36 to complete housing 33 by soldering, brazing, or other known technique. As another alternative, cap member 37 may be a screw cap member similar to member 17 of FIG. 1.

The embodiment illustrated in FIG. 2 is intended to be employed, in one application, in conjunction with a standard T connector of the type well known in the art. The device of FIG. 2 is connected to the take-off port of the T connector and the remaining connectors thereof are attached to the cable to be protected. In this configuration, the equivalence of the embodiments of FIG. 1 and FIG. 2 is obvious in that the series LC circuit comprising members 41 and 52 of FIG. 2 is connected electrically across conductors 32 and 35 of connector 31.

It should also be realized that the stack configuration 52 shown in FIG. 2 may be substituted into FIG. 1 for the single varistor element 25 shown therein; similarly, varistor element 25 of FIG. 1 could be substituted for stack assembly 52 in FIG. 2.

In both embodiments, at least cap members 17 and 37 are preferably formed of thermally conductive, thermally massive materials to function as heat sinks for the varistor elements employed. For this reason it is preferred to have the varistor member rather than the spring member in contact with the housing.

While this invention has been described with reference to particular embodiments and examples, other modifications and variations will occur to those skilled in the art in view of the above teachings. Accordingly, it should be understood that within the scope of the appended claims, the invention may be practiced otherwise than specifically described.

The invention claimed is:

1. Apparatus for suppression of voltage surges on VHF signal cables comprising:

a body of varistor material having a pair of opposed faces and an electrode on each of said faces;

an inductor having first and second terminals, said first terminal being electrically connected to one of said electrodes;

means for connecting said second terminal to a first conductor of a VHF signal cable; and means including an electrically conductive housing member for connecting the other of said electrodes to a second conductor of said VHF signal cable;

said body of varistor material and said inductor cooperatively forming a series resonant circuit connected between said first and second conductors of said VHF signal cable when the voltage across said first and second conductors is less than the varistor voltage of said body of varistor material;

said series resonant circuit being resonant at a frequency below 30 MHz;

said inductor being an electrically conductive coil spring disposed within said housing for urging said other of said electrodes into contact with a surface of said housing.

2. The apparatus of claim 1 wherein said means for connecting said second terminal to a first conductor comprises a conductive member having a first portion thereof disposed within said housing and further including:

a generally annular insulating member disposed within said housing for supporting said first portion therein and for preventing electrical contact therebetween;

and a second portion of said conductive member, said second portion extending through said insulating member from said housing for connection to said first conductor.

3. Apparatus in accordance with claim 2 including additionally a first coaxial connector having inner and outer conductors, said inner conductor being connected to said second portion of said conductive member and said outer conductor being connected to said housing.

4. The apparatus of claim 3 including additionally a second coaxial connector connected back-to-back with said first coaxial connector to provide for direct insertion of said apparatus in a coaxial VHF signal cable.

5. The apparatus of claim 4 wherein said housing is mechanically continuous with said outer conductors.

6. Apparatus in accordance with claim 2 including additionally a coaxial connector and wherein:

said second portion of said conductive member comprises a center conductor of said coaxial connector; and said housing includes a nipple portion comprising an outer conductor of said coaxial connector.

7. Apparatus in accordance with claim 1 wherein there are a plurality of said bodies of varistor material having electrodes and further comprising conductive means for securing said bodies in a stack configuration and for interconnecting said bodies electrically in parallel.

8. The apparatus of claim 7 wherein said conductive means is electrically symmetrical to provide for equal current sharing among said bodies of varistor material.

9. Apparatus in accordance with claim 1 wherein at least a portion of said housing comprises thermally massive, thermally conductive, material to provide a heat sink for said body of varistor material.

* * * * *